US008381150B2

(12) United States Patent
Zolotov et al.

(10) Patent No.: US 8,381,150 B2
(45) Date of Patent: Feb. 19, 2013

(54) METHOD FOR PERFORMING A PARALLEL STATIC TIMING ANALYSIS USING THREAD-SPECIFIC SUB-GRAPHS

(75) Inventors: Vladimir Zolotov, Putnam Valley, NY (US); David J. Hathaway, Underhill Center, VT (US); Kerim Kalafala, Rhinebeck, NY (US); Mark A. Lavin, Katonah, NY (US); Peihua Qi, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/151,295

(22) Filed: Jun. 2, 2011

(65) Prior Publication Data
US 2012/0311515 A1 Dec. 6, 2012

(51) Int. Cl.
*G06F 17/50* (2006.01)
(52) U.S. Cl. ........ 716/108; 716/103; 716/104; 716/105; 716/113; 716/134
(58) Field of Classification Search .................. 716/103, 716/104, 105, 106, 108, 113, 134
See application file for complete search history.

(56) References Cited

U.S. PATENT DOCUMENTS

| | | | | |
|---|---|---|---|---|
| 5,636,372 A | | 6/1997 | Hathaway et al. | |
| 6,557,145 B2 * | | 4/2003 | Boyle et al. | 716/105 |
| 6,557,151 B1 * | | 4/2003 | Donath et al. | 716/108 |
| 7,089,511 B2 * | | 8/2006 | Allen et al. | 716/103 |
| 7,234,126 B2 * | | 6/2007 | Catthoor et al. | 716/104 |
| 7,512,919 B2 | | 3/2009 | Visweswariah | |
| 7,574,690 B2 * | | 8/2009 | Shah et al. | 717/104 |
| 7,725,856 B1 | | 5/2010 | Govig et al. | |
| 7,739,098 B2 | | 6/2010 | Kucukcakar et al. | |

(Continued)

OTHER PUBLICATIONS

Liu et al.; "Automatic run-time extraction of communication graphs from multithreaded applications"; Publication Year: 2006; Hardware/Software Codesign and System Synthesis, 2006. CODES+ISSS '06. Proceedings of the 4th International Conference; pp. 46-51.*
Transistor Level Gate Modeling for Accurate and Fast Timing, Noise, and Power Analysis, Raja, et al., DAC 2008, Jun. 8-13, 2008, Anaheim, CA, pp. 456-461.

(Continued)

*Primary Examiner* — Helen Rossoshek
(74) *Attorney, Agent, or Firm* — H. Daniel Schnurmann

(57) ABSTRACT

A method for efficient multithreaded analysis of a timing graph is described. The method is applicable to multithreaded common path pessimism removal, critical path traversing for timing report generation, and other types of analysis requiring traversal of sub-graphs of timing graph. In order to achieve high efficiency and scalability for parallel multithreaded execution, the number of access locks is minimized. One parent computation thread and multiple child threads are employed. The parent computational thread identifies the tasks for analysis and distributes them among child threads. Each child thread identifies a sub-graph to be analyzed, creates a thread-specific replica of the identified sub-graph, and performs the analysis required. After completing the analysis, the child thread transfers the results back to the main timing graph and waits for next task. As all data structures of each child thread are accessed only by the child thread owing them, no access locks are required for construction and processing of thread specific graph replica of the timing sub-graph. The construction of each thread specific graph replica is performed by the child thread without locking the main timing graph data structures. Access locks are used only for transferring results of the analysis back to the main timing graph where the results computed by all child threads are combined together.

20 Claims, 14 Drawing Sheets

U.S. PATENT DOCUMENTS

| | | | |
|---|---|---|---|
| 7,765,503 B2 | 7/2010 | Smith | |
| 7,793,243 B1 | 9/2010 | Becer et al. | |
| 7,797,658 B2 * | 9/2010 | Chen et al. | 716/113 |
| 7,831,951 B2 * | 11/2010 | Catthoor et al. | 716/104 |
| 7,958,474 B2 * | 6/2011 | Chen et al. | 716/108 |
| 7,971,120 B2 * | 6/2011 | Shi et al. | 714/741 |
| 2005/0066297 A1 | 3/2005 | Kalafala et al. | |
| 2007/0203683 A1 * | 8/2007 | Kornerup et al. | 703/19 |
| 2009/0327985 A1 | 12/2009 | Chen et al. | |
| 2012/0066656 A1 * | 3/2012 | Sripada et al. | 716/108 |

OTHER PUBLICATIONS

"Prototype for a Large-Scale Static Timing Analyzer Running on an IBM Blue Gene", Holder, et al., 24th IEEE International Symposium on Parallel and Distributed Processing, IPDPSW 2010, Atlanta, GA, Apr. 19-23, 2010.

* cited by examiner

| ACCESS CONTEXT | OPERATION | PUBLIC READ-ONLY PROPERTY | PUBLIC UPDATABLE PROPERTY | PRIVATE PROPERTY OF TSGR |
|---|---|---|---|---|
| Main thread | retrieve | Read public read-only property without lock | 1. Lock;<br>2. Read public updatable property;<br>3. Unlock; | ERROR |
| Main thread | add | ERROR | 1. Lock;<br>2. Add public updatable property;<br>3. Unlock; | ERROR |
| Main thread | remove | ERROR | 1. Lock;<br>2. Remove public updatable property;<br>3. Unlock; | ERROR |
| Main thread | lock/unlock | ERROR | Lock/unlock public updatable properties | ERROR |
| Child thread | retrieve | Read private TSGR property without lock.<br>If there is no TSGR property read public read-only property without lock | 1. Lock;<br>2. Read public updatable property;<br>3. Unlock; | Read from TSGR properties without lock |
| Child thread | add | ERROR | 1. Lock;<br>2. Add public updatable property;<br>3. Unlock; | Add to TSGR properties without lock |
| Child thread | remove | ERROR | 1. Lock;<br>2. Remove public updatable property;<br>3. Unlock; | Remove from TSGR properties |
| Child thread | lock/unlock | ERROR | Lock/unlock public updatable properties | ERROR |

FIG. 7

METHOD FOR PERFORMING A PARALLEL STATIC TIMING ANALYSIS USING THREAD-SPECIFIC SUB-GRAPHS

FIELD OF THE INVENTION

This invention relates to electronic design automation and, more particularly to a parallel static timing analysis using thread-specific sub-graphs for common path pessimism removal, critical path report generation and other procedures requiring traversing multiple non disjoint sub-graphs of a timing graph.

BACKGROUND

The goal of static timing analysis (STA) is to determine the latest and earliest possible switching times of various signals within a digital circuit. STA can generally be performed at the transistor level or at the gate level, using pre-characterized library elements, or at higher levels of abstraction, for complex hierarchical chips.

STA algorithms operate by first levelizing the logic structure, and breaking any loops in order to create a directed acyclic graph (timing graph). Nodes of the timing graph are referred to as timing points, and correspond to electrical nodes in the digital circuit (typically "pins" or ports of the circuit elements) at which signal transitions (e.g., from low to high or from high to low) can occur. Edges of the timing graph can include directed propagate segments which correspond to paths through circuit elements through which signal transitions can propagate, and typically go from input to output of the elements or gates of the digital circuit, and from source to sink of the nets of the digital circuit. A timing graph can also contain edges known as test segments which represent constraints on the relationship between timing values of the nodes at the ends of the test segment. Modern designs can often contain millions of placeable objects, with corresponding timing graphs having millions, if not tens of millions of nodes. For each node, a corresponding arrival time, transition rate (slew), and required arrival time are computed for both rising and falling transitions as well early and late mode analysis. An arrival time (AT) represents a bound on latest or earliest time at which a signal can transition due to the entire upstream fan-in cone. The slew value is the transition rate associated with a corresponding AT, and a required arrival time (RAT) represents a bound on the latest or earliest time at which a signal must transition due to timing constraints in the entire downstream fan-out cone.

ATs are propagated forward in a levelized manner, starting from the chip primary input asserted (i.e., user-specified) arrival times, and ending at either primary output ports or intermediate storage elements. For single fan-in cases, AT sink node=AT source node+delay from source to sink.

Whenever multiple signals merge, each fan-in contributes a potential arrival time computed as AT sink(potential)=AT source+delay, making it possible for the maximum (late mode) or minimum (early mode) of all potential arrival times to be retained at the sink node. Typically an exact delay value for an edge in a timing graph is not known, but instead only a range of possible delay values can be determined between some minimum delay and maximum delay. In this case, maximum delays are used to compute late mode arrival times and minimum delays are used to compute early mode arrival times.

RATs are computed in a backward levelized manner starting from either asserted required arrival times at the chip primary output pins, or from tests (e.g., setup or hold constraints) at internal storage devices. A test segment imposes a constraint between the ATs at its endpoints, for example, a setup test segment typically imposes a requirement that the AT of a data signal at one end precede the AT of a clock signal at the other end by some interval known as the setup or guard time, and a hold test imposes a similar requirement that clock precede data. For single fan-out cases, RAT source node=RAT sink node−delay.

When multiple fan-outs merge (or when a test is present), each fan-out (or test) contributes a prospective RAT, enabling the minimum (late mode) or maximum (early mode) required arrival time to be retained at the source node. When only a range of possible delay values can be determined, maximum delay are used to compute late mode required arrival times and minimum delays are used to compute early mode required arrival times.

The difference between the arrival time and required arrival time at a node (i.e., RAT−AT in late mode, and AT−RAT in early mode) is referred to as slack. A positive slack implies that the current arrival time at a given node meets all downstream timing constraints, and a negative slack implies that the arrival time fails at least one such downstream timing constraint. A timing point can include multiple parameters such as AT, RAT, and slew values, each denoted with a separate tag, in order to represent data associated with different clock domains (i.e., launched by different clock signals), to distinguish values for rising and falling transitions, or for the purpose of distinguishing information for a specific subset of an entire fan-in cone or fan-out cone.

Under certain circumstances, the approach described above for computing slack can result in an overly pessimistic estimate of timing performance. One such overly pessimistic scenario occurs in the situation where early and late propagation delays are different (e.g. to account process variability), and both early and late mode signals involved in timing test share a common part of their (typically clock) propagation paths. In such a scenario, while an exact value of propagation delay for the common propagation elements is unknown, it is typically impossible for such common delay elements to be operating at both early and late delay extremes simultaneously, and hence slack computed using extremes of late data and early clock (or vice versa) arrival times at a test results in an overly pessimistic bound on circuit performance. This pessimism can be reduced or even fully removed by the prior art technique of common path pessimism removal (CPPR).

In addition to correlations due to physically common portions of late and early mode paths, there can be correlations due to delay dependencies on common sources of variation (e.g., manufacturing or environmental). Therefore, when early and late paths leading to a given test represent different points in a process distribution (e.g., late mode delays are computed based on slow conditions, and early mode delays are computed assuming a different set of fast process conditions), an undo amount of pessimism is introduced when comparing resulting early and late arrival times at a test. The prior art method provides for additional pessimism relief to by accounting for early and late delay dependencies on common sources of variation by analyzing pairs of launch and capture paths.

The aforementioned prior art techniques are further extended to include credit for statistically independent delay contributions along a path (i.e., by computing a statistical root-sum-square [RSS] credit value for random delay along a path and/or by computing additional RSS credit for delay impact due to global sources of variation which are statistically independent of each other).

However, all the aforementioned prior art techniques for performing CPPR analysis require computation and propagation through the timing graph of separate timing values for each point at which common paths diverge, or for each test for which pessimism removal is performed. This can lead to large memory requirements in the computation process, and a common way to mitigate this memory requirement is to compute such values for one divergence point or for one test at a time and storing them in a common reused location in the timing graph being analyzed. Because of the reuse of storage locations in the main timing graph, these approaches are not amenable to parallel execution. Even when a common storage location is not used, the modification of the main timing graph in order to insert extra tags or add other attributes to the main timing graph in order to keep track of specific launch and capture path pairs and their associated commonality also creates a point at which parallel threads of computation would typically need to be locked.

In the domain of traditional block-based STA (as opposed to path-based CPPR analysis), several prior art efforts have been applied to speed up the static timing analysis.

One method exploits the fact that static timing analysis is required to be performed for different values of process and environmental parameters. It is proposed to make the runs in parallel on different computers or different processors and then merge the results into a joint report. This method has three major drawbacks. First, it can be applied only if it is required to run timing for different set of process and environmental parameters. This is not always the case, especially considering the emergence of statistical timing techniques capable of predicting circuit timing in the entire space of variational parameters. Second, each timing run consumes large amount of computer memory. Therefore, the total memory consumption is several times higher than in the conventional sequential timing run. Third, the combination of several timing reports together is a difficult and computationally expensive task.

In the prior art, a run is performed using different timing modes, particularly early and late mode timing analysis. However, it reduces the run time by at most a factor of two, and requires twice as much memory for constructing two virtual timing graphs for these modes. In another prior art method, it is proposed creating a virtual timing graph for each process corner or analysis mode. Yet another prior art method proposes partitioning timing graph into several clock domains, processing each domain by a separate computation thread, which, likewise, has serious drawbacks associated thereof.

In view of the failures encountered in the prior art, there is a need for a system and a method for efficiently performing static timing analysis which is amenable to parallelizing time consuming steps such as CPPR, traversing paths for identifying a set of critical paths, generating timing reports, and similar procedures that analyze and modify multiple non disjoint sub-graphs of a timing graph.

BRIEF DESCRIPTION OF THE DRAWINGS

The present invention will be understood and appreciated more fully from the following detailed description of the invention, taken in conjunction with the accompanying drawings of which:

FIG. 7 is a table specifying access rules for properties that are in effect when any TSGR data structures are processed by child threads, according to an embodiment of the present invention;

SUMMARY

Figure 1:
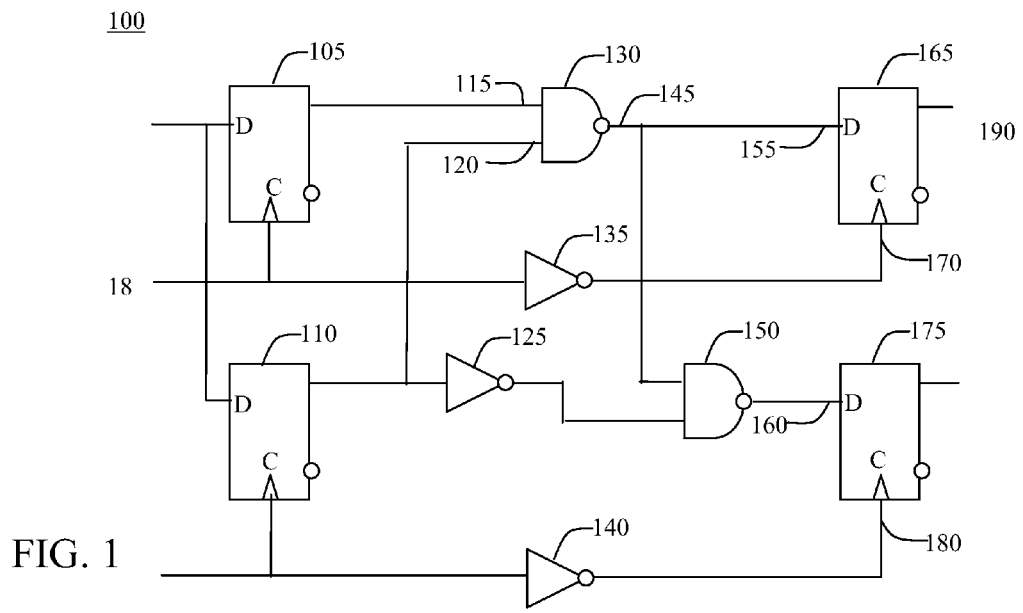
FIG. 1 illustrates a prior art digital circuit.

According to one embodiment of the invention, a parent computational thread owns the main timing graph and distributes analysis tasks among plurality of child threads, wherein in turn each performs the following actions: receive a request for analysis of sub-graph of the main timing graph; create thread specific graph replica (TSGR) of sub-graph of the main timing graph; perform required analyses on thread specific graph replica of a sub-graph, and transfer the results back to the main timing graph, if required.

In another embodiment, a TSGR is provided that includes a plurality of replica nodes corresponding to nodes of a sub-graph of the main timing graph; identifying a plurality of replica edges corresponding to edges of a sub-graph of the main timing graph; mapping from nodes of replica nodes to nodes of the main timing graph; mapping from nodes of the main timing graph to replica nodes and a plurality of private properties of nodes and edges.

In still another embodiment, a main timing graph is provided that includes a plurality of public read only properties of nodes and edges and a plurality of public updatable properties of nodes and edges.

In yet another embodiment, the main graph thread does not access TSGRs belonging to child threads.

In a further embodiment, the child threads do not access thread specific graph replicas belonging to the other child threads.

In still a further embodiment, a method for creating a TSGR of the main timing graph includes: traversing sub-graph of the main timing graph that requires replication, and incremental update of thread specific graph replica of subgraph of the main timing graph.

In yet a further embodiment, a method of creating TSGR is provided, wherein the incremental update of TRGR includes: constructing a replica node corresponding to the node of the main timing graph, updating a mapping nodes of the main timing graph to the nodes of the TSGR by adding an entry corresponding to the constructed node, updating a map of thread specific graph replica to nodes of the main timing graph by adding an entry corresponding to the constructed node, iterating through incoming edges of the replicated node of the main timing graph, replicating the edges for which thread specific graph replica has source nodes replicated, and iterating through outgoing edges of the replicated node of the main timing graph and replicating the edges for which thread specific graph replica has sing nodes replicated.

In yet another embodiment, the multithreaded analysis of the timing graph includes performing common path pessimism removal and computing critical paths for timing reports.

DETAILED DESCRIPTION

According to one embodiment, computations are performed by one parent computational thread and a plurality of child threads. The main thread owns the main timing graph and distributes the computational tasks among child threads. A child thread constructs thread specific graph replica (TSGR) of the sub-graph to process, performs analysis of TSGR, and transfers results back to the main timing graph, if required.

The computations can be performed by a parent computational thread and a plurality of child threads that includes performing a common path pessimism removal. The present method is applicable to numerous algorithms of processing timing graph sub-graphs by traversing their paths, performing breadth first or depth first, or any other kind of graph traversal.

Referring to FIG. 1, an example circuit topology is illustrated comprising gates 125, 130, 135, 140, and 150, memory elements 105, 110, 165, and 175, various nets interconnecting them, such as 1165, 120, 155, and 160, primary inputs such as 185, and primary outputs such as 190.

Figure 2:
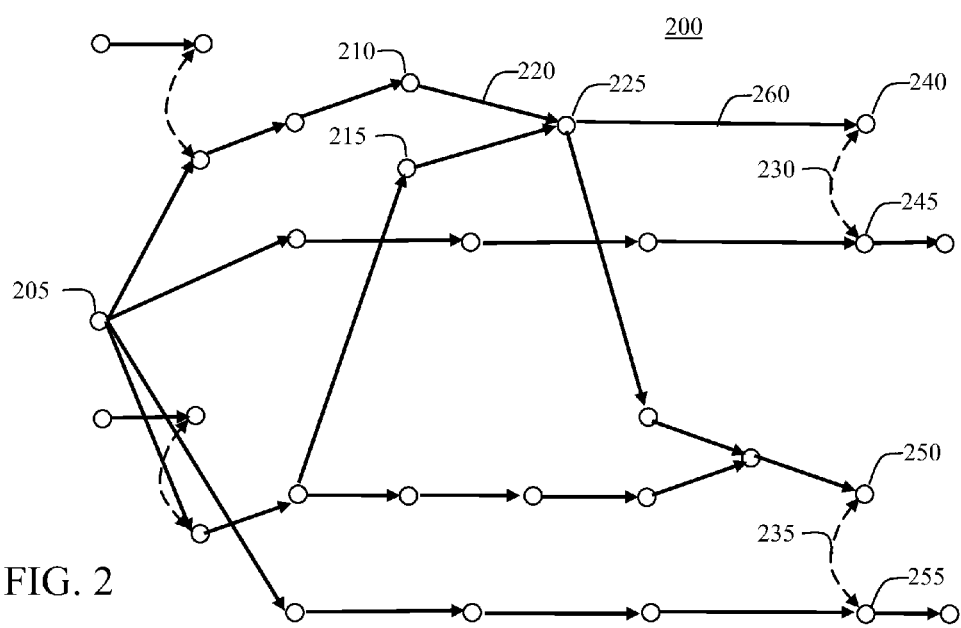
FIG. 2 is a timing graph applicable to prior art circuit shown in FIG. 1.

Referring to FIG. 2, a timing graph for the circuit topology of FIG. 1 is depicted, in which open circles represent timing points, solid arrows represent propagate segments, and dashed double-ended arrows represent test segments. The timing points correspond to primary inputs, primary outputs, and gate and memory element pins; for example, timing point 205 corresponds to primary input 185, and timing points 210 and 215 correspond to input pins of gate 130. Propagate segments correspond to delay paths through gates or nets; e.g., propagate segment 220 corresponds to the delay path from the first input of gate 130 to its output, and propagate segment 260 corresponds to the delay from the output of gate 130 to the data input of memory element 165. Test segments correspond to timing constraints of memory elements; e.g., test segments 230 and 235 correspond to setup or hold tests between the clock and data pins of memory elements 165 and 175, respectively.

Figure 3:
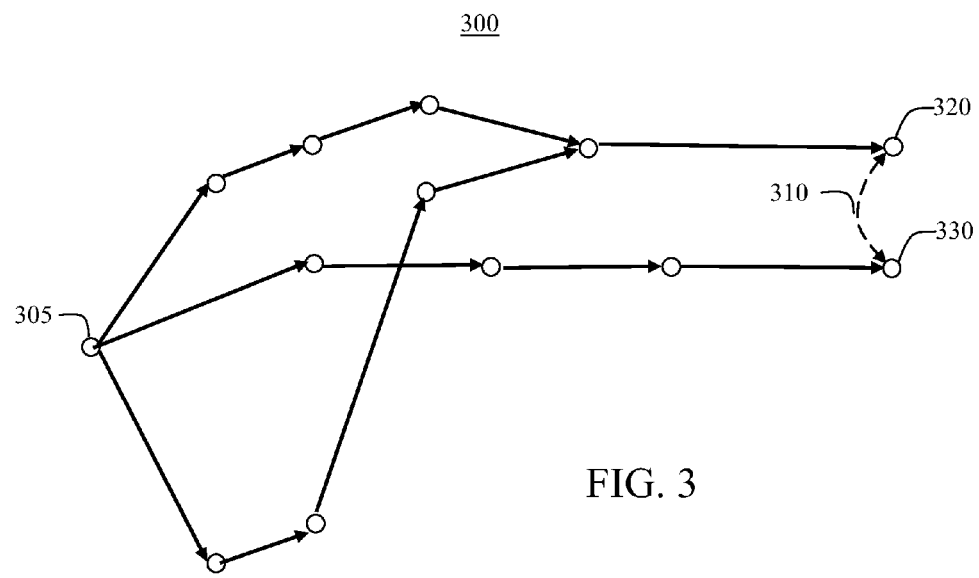
FIGS. 3 and 4 are examples of sub-graphs and timing graph performed on the circuit shown in accordance to one embodiment of the invention.
Figure 4:
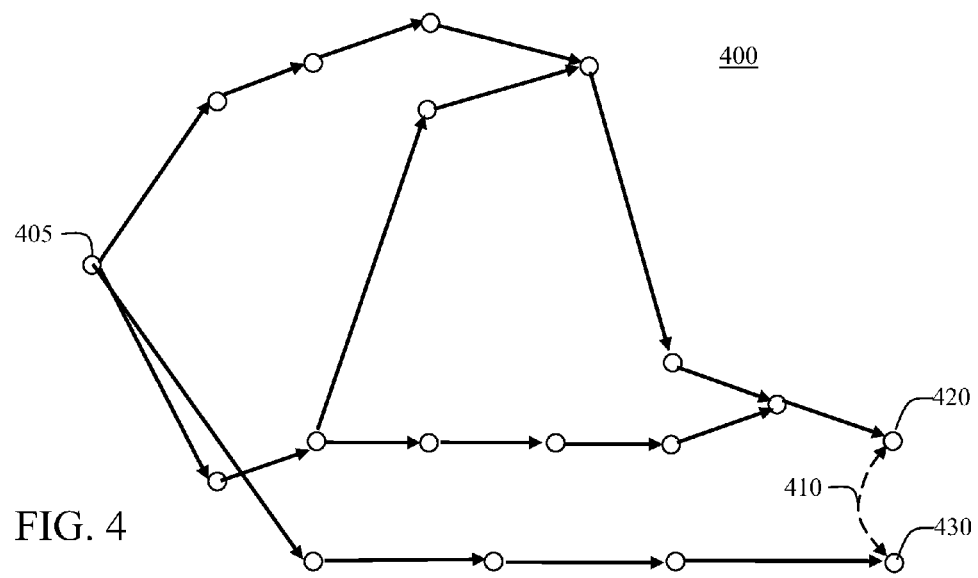

Referring to FIGS. 3 and 4, examples of sub-graphs 300 and 400 of timing graph 200 shown in FIG. 2 are illustrated. Sub-graph 300 of FIG. 3 corresponds to the sub-graph required to perform CPPR or other analysis for timing test 230 between nodes 240 and 245. Timing test 310 of sub-graph 300 corresponds to timing test 230 of timing graph 200. Nodes 305, 320, and 330 of sub-graph 300 correspond to nodes 205, 240, and 245 of timing graph 200, respectively.

Sub-graph 400 of FIG. 4 corresponds to the sub-graph required to perform CPPR or other analysis for timing test 235 between nodes 250 and 255. Timing test 410 of sub-graph 400 corresponds to timing test 235 of timing graph 200. Nodes 405, 420, and 430 of sub-graph 400 correspond to nodes 205, 250, and 255 of timing graph 200, respectively. Sub-graphs 300 and 400 intersect with each other. For the example node 305 of sub-graph 300 and node 405 of sub-graph 400 correspond to the same node 205 of timing graph 200. The present method provides means for simultaneous traversing the sub-graphs by different computational threads without setting access locks.

Figure 5:
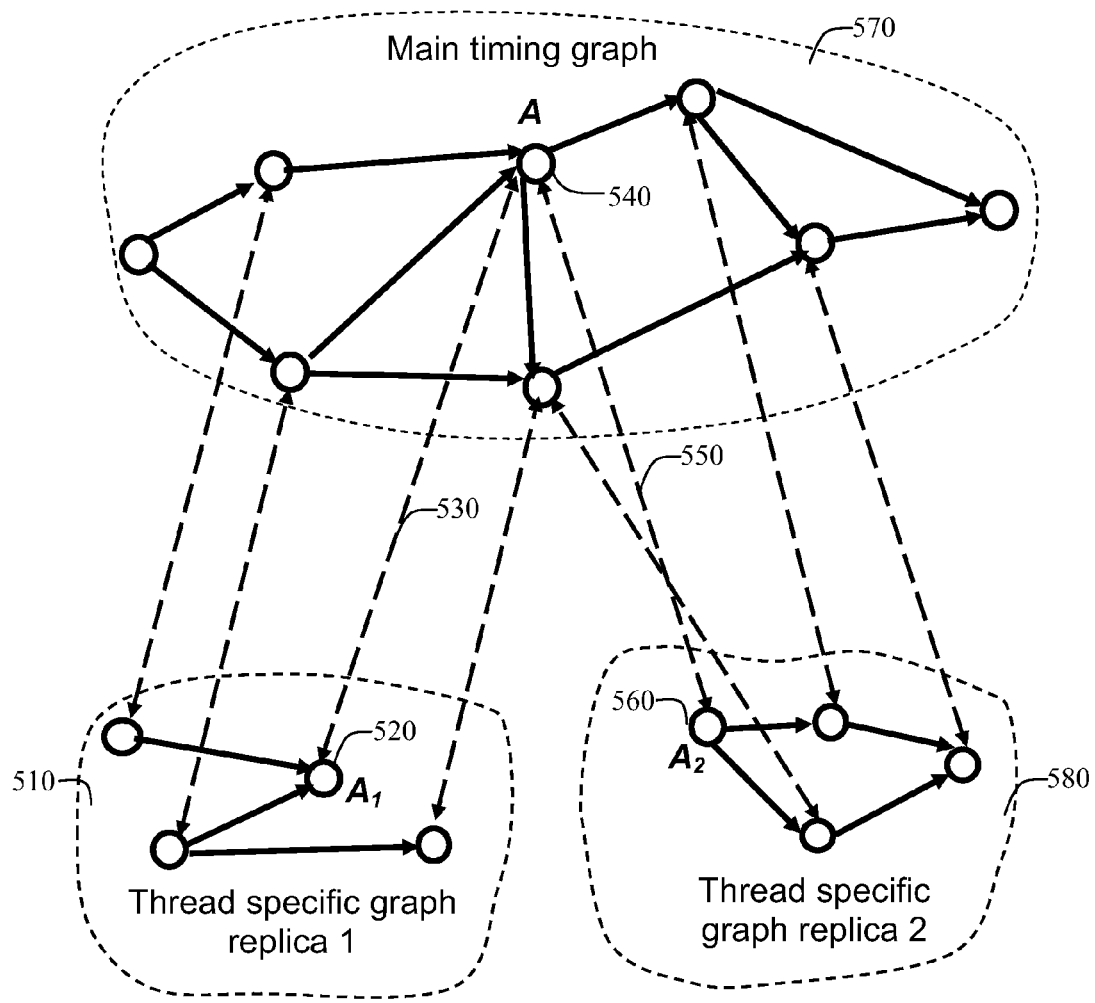
FIG. 5 illustrates relation between the main timing graph and tow thread specific graph replicas, in accordance with one embodiment of the invention.

Referring to FIG. 5, the relation between a main timing graph 570 and two thread specific graph replicas (TSGRs) 510 and 580 is depicted. Dashed lines with arrows indicate correspondence between nodes of the main timing graph and the replica nodes of a TSGR. By way of example, dashed line 530 indicates that node 520 of TSGR 510 is a replica of node 540 of main timing graph 570. Similarly, dashed line 550 indicates that node 560 of TSGR 580 is a replica of node 540 of main timing graph 570.

Figure 6:
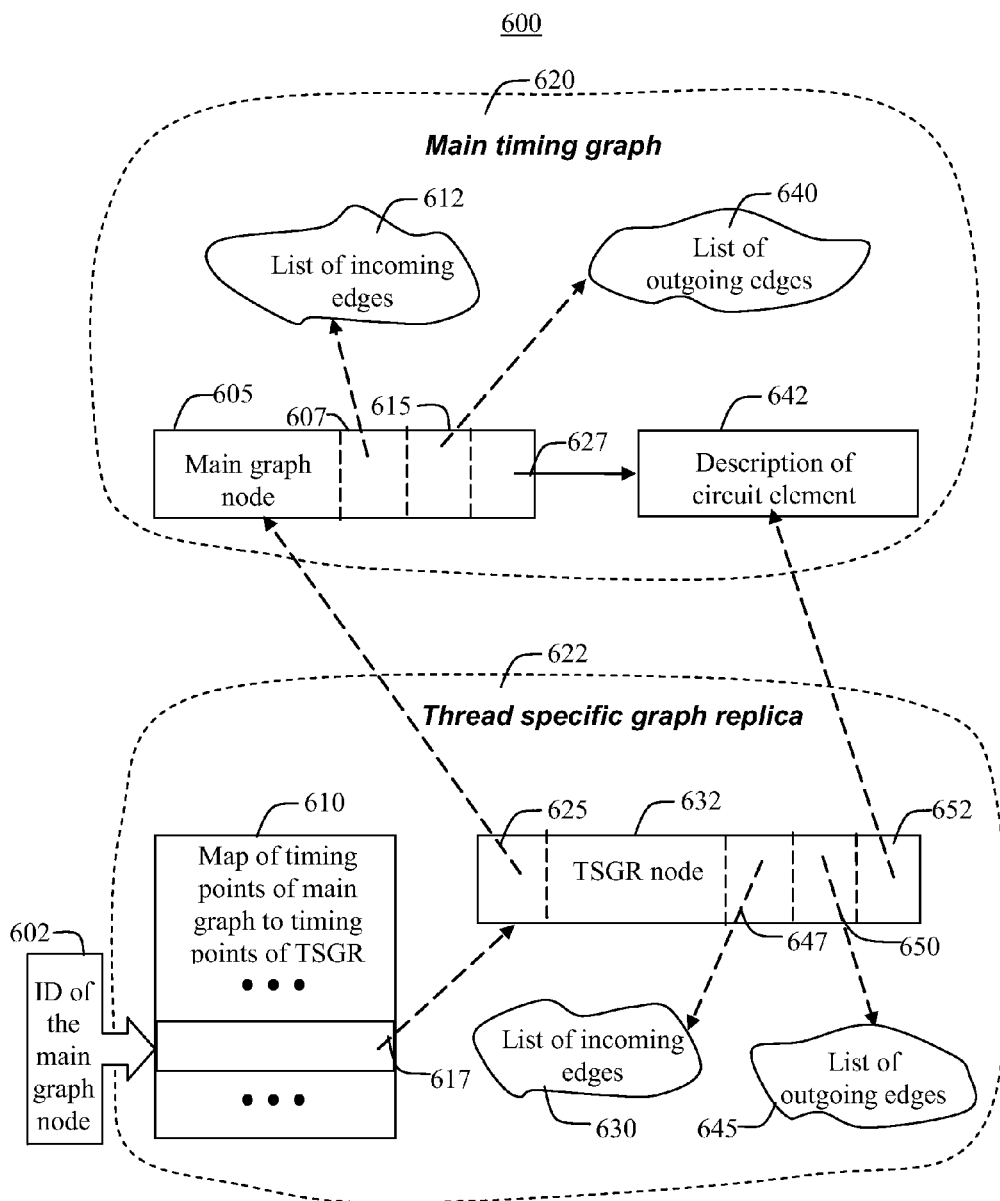
FIG. 6 is a fragment of data structures implementing the main timing graph and thread specific graph replica (TSGR), according to one embodiment of the invention.

Referring now to FIG. 6, a data structure 620 is shown, implementing the main timing graph and data structure 622 implementing TSGR. Shown therein are only those elements necessary for understanding the present invention, but not described in all its details. It should be understood that the actual implementation can vary between different timing analysis systems according to the details of the particular algorithm for which the sub-graph analysis is being used.

Data structure 620 includes one or more instance of object 605 describing a node of the main timing graph, and for each instance of node structure 605, corresponding instances of list 612 of incoming edges, list 640 of outgoing edges, and object 642 describing a circuit element corresponding to the node (e.g., a pin of a logic gate or memory element). Link 607 indicates that list 612 is a list of the edges incoming to the node described by object 605. Link 615 indicates that list 640 is a list of the edges outgoing from the node described by object 605. Links 607 and 615 are used for identifying the edges incoming to the node and outgoing from it. Link 627 pointing to object 642 indicates that the node described by object 605 corresponds to a pin of the circuit element described by object 642.

Data structure 622 includes map 610 relating nodes of the main timing graph to corresponding nodes of TSGR, one or more instance of object 632 describing a node of TSGR, and for each instance of node structure 632, corresponding instances of list 630 of incoming edges, list 645 of outgoing edges. Link 647 indicates that list 630 is the list of the edges incoming to the node described by object 632. Link 650 indicates that list 645 is the list of the edges outgoing from the node described by object 632. Link 652 pointing to object 642 of the main timing graph data structure 620 indicates that the node described by object 632 corresponds to a pin of the circuit element described by object 642. In order to reduce memory consumption, object 642 is not replicated in TSGR data structure. The approach can also be applied to other objects of the main timing graph data structure that are not modified when processing TSGR.

Still referring to FIG. 6, link 625 pointing to object 605 of the main timing graph data structure is used for mapping from TSGR nodes to the corresponding nodes of the main timing graph. Using such a link, a child thread operating on a TSGR can quickly find the node of the main timing graph corresponding to a given TSGR node. The reciprocal function is fulfilled by map 610. The input 602 to map 610 is an identifier of a main timing graph node (e.g., a pointer value or name string). The result of a lookup operation using map 610 is link 617 to the object 632 describing TSGR node corresponding to input 602 of the map. Thus, link 625 and map 610 considered together provide bidirectional mapping between TSGR nodes and the corresponding nodes of the main timing graph. Many ways can be used to implement map 610. For illustrative purposes, computationally efficient implementations include a hash table, search tree, and a sorted array.

In order to minimize the number of access locks and the time when data are in the locked state, the parent computational thread and child threads processing thread specific graph replicas preferably operate according to rules, as described hereinafter.

The nodes and edges of the main timing graph are made read only (no nodes or edges can be added or deleted).

Each attached data value for nodes and edges of the main timing graph (e.g., ATs, slews, RATs and other properties on nodes and delays and other properties on edges) is classified as either read only or being updatable.

The read only data of the main timing graph can be accessed without setting locks for reading both by the parent computational thread and child threads.

The updatable data of the main timing graph can be accessed (read or write) only by locking, performing the access, and then unlocking. The lock/unlock can enclose multiple accesses if an updated value needs to be computed based on the current value (e.g., set a value to the min of its current value and some new value).

The parent computational thread never accesses any TSGR. Each child thread accesses only its own TSGR and never accesses TSGR of other threads. No lock is required for a child thread to access its own TSGR.

Algorithms operating on the timing graph include algorithms for path and graph traversing requiring setting, updating and removing properties at nodes and edges of the timing graph. It is useful for a general purpose timing graph structure intended to support a variety of different algorithms, including both CPPR and other algorithms, to allow storage and retrieval of arbitrary properties on the nodes and edges of the timing graph. These can include temporary timing values used in an algorithm, node and edge markings, or other data. Such properties can be set, updated and removed by referencing nodes and edges belonging both to the main timing graph and TSGR, and can be attached to connect to nodes and edges of the main timing graph and TSGR. A common method for attaching an arbitrary number of properties to a graph object and to allow for efficient addition and deletion of properties consists of organizing them in linked lists attached to each timing graph node and edge. The present embodiment illustrates data structures properties using an example of node properties. However, the same data structures can be used for implementing properties attached to edges or any other elements of timing graph.

In order to minimize the number of access locks and the time when data remains locked, the present invention classifies properties to private properties of TSGR, public read only properties, and public updatable properties. Each TSGR can have its own private properties attached to its nodes. The private properties of TSGR are accessed only by the child thread that owns TSGR. Neither the parent computational thread nor the other child threads are allowed to access them. Therefore, private properties of TSGR can be created, read, updated and removed without setting any access locks, all of which can be useful for implementing a CPPR analysis or other traversal algorithms on TSGR that require attaching flags, marks of any other data to nodes or edges of TSGR. Since the private properties of TSGR do not require access locks, CPPR or other algorithms traversing TSGR can operate without locks in many child threads simultaneously.

The public read only properties are owned by the main timing graph, and are attached to its nodes or edges. The public read only properties can be accessed both by the parent computation thread and all child threads. However, only a read access to the public read only properties is allowed. Neither the parent computational thread nor the child threads are allowed to create, update and remove the public read only properties. Therefore, the public read only properties can be accessed without setting access locks. Furthermore, the public read only properties can be created, modified and removed either before the child threads start their operation or after the child threads stop their operation. The public read only properties are convenient for attaching to the nodes of the main timing graph data common to all the child threads. The child threads access the public read only properties by identifying the main timing graph node corresponding to a given TSGR node, and then accessing its public read only properties.

Since the public updatable properties are owned by the main timing graph and are attached to its nodes and edges, public updatable properties can be created, read, updated, and removed both by the main timing graph and the child threads. Therefore, access to the public updatable properties is guarded by access locks. According to one embodiment, one possible application of public updatable properties is storing post-CPPR timing slack.

FIG. 7 shows table 700 specifying access rules for all three types of properties that are in effect when any TSGR data structures are being processed by child threads. Column 710 referred to as "Access context" specifies whether the property is accessed by the parent computational thread or by a child thread. Column 720 labeled "Operation" specifies the operation on property that can be retrieved, added, removed, locked and unlocked. Column 730 referred to "Public Read-Only Property" defines the semantic of the operation on public read only properties. "Errors" in the table refer to an operation on the property of a type not allowed in that context. Column 740 labeled "Public Updatable Property" defines the semantic of the operation on the public updatable properties. Column 750 referenced "Private Property of TSGR" defines the semantic of the operation on the TSRG private properties.

Figure 8:
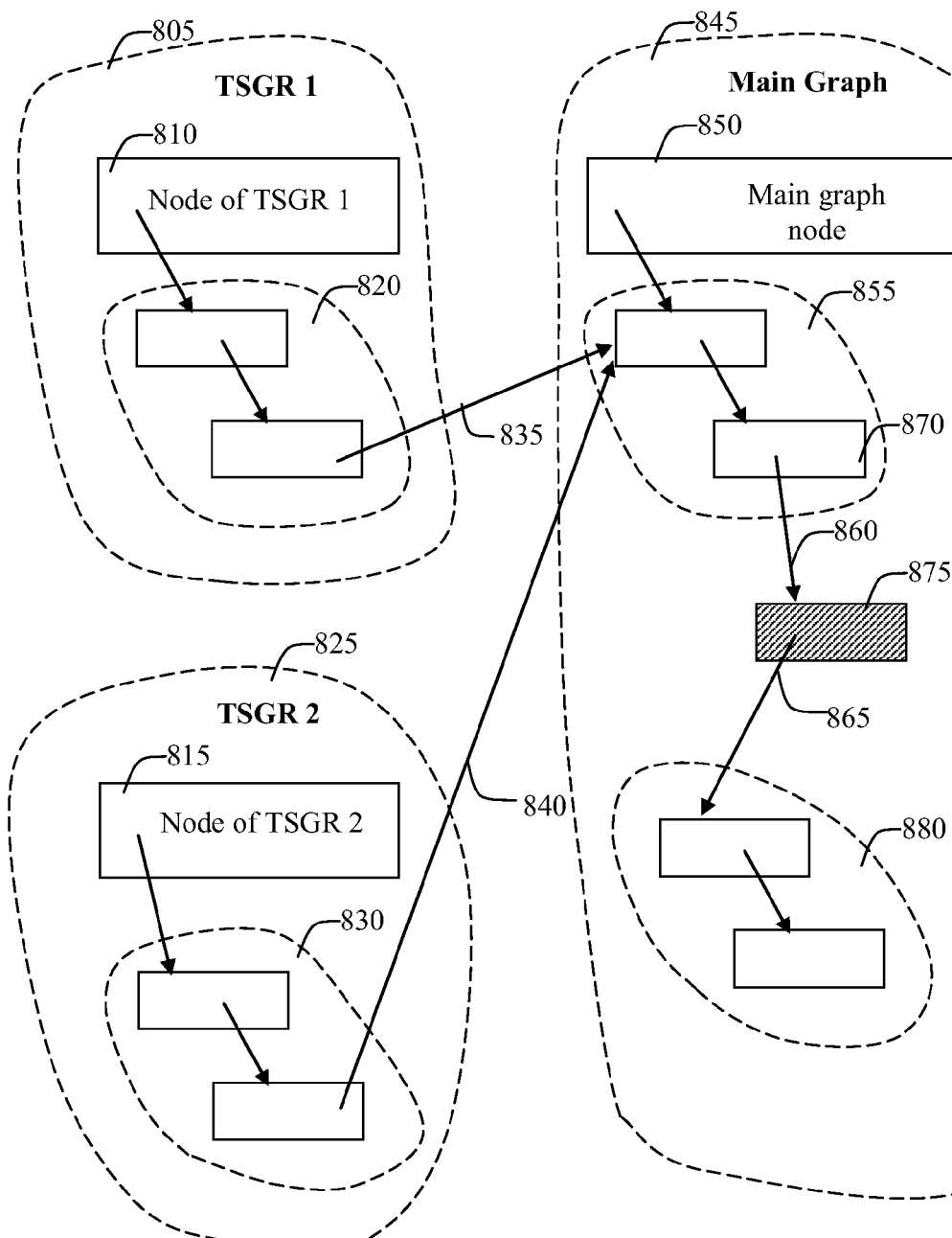
FIG. 8 is a data structure implementing property lists according to one embodiment of the invention.

Referring now to FIG. 8, implementation 800 of properties of main timing graph and TSGR are illustrated, according to one embodiment of the present invention. The implementation is illustrated with fragment 845 of the main timing graph data structure and two fragments 805 and 825 of TSGR data structures. The implementation is shown for properties attached to nodes. The properties attached to edges can be implemented similarly to the implementation shown.

Fragment 845 of main timing graph data structure includes object 850 describing a node of the main timing graph with linked list 855 of public read only properties and linked list 880 of public updatable properties attached to that node. The last element 870 of linked list 855 has link 860 pointing to connector element 875, which has link 865 pointing to linked list 880.

This arrangement of public read only and public updatable properties is used by the function retrieving a required property attached to a given node. When this function looks for either a public read only property or an updatable property, connector element 875 indicates the end of list 870 of public read only properties and the beginning of list 880 of public updatable properties.

Fragment 805 of TSGR consists of object 810 describing a node of TSGR and linked list 820 of private TSGR properties attached to that node. Herein, TSGR node described by object 810 corresponds to the main timing graph node described by object 850.

Fragment 825 of TSGR depicts object 815 describing a node of TSGR and linked list 830 of private TSGR properties attached to the node. Herein, TSGR node described by object 815 corresponds to the main timing graph node described by object 850.

The last element of linked list 820 shows link 835 pointing to the first element of linked list 855. Similarly, the last element of linked list 830 has link 840 also pointing to the first element of linked list 855. The arrangement of linked lists of the private TSGR properties is used by the function retrieving a required property attached to a given TSGR node. After traversing the list of private TSGR properties, the function continues its search among public read only properties. Therefore, private TSGR properties are given always a higher priority (i.e., are reached first in the concatenated linked list) than public read only properties.

An embodiment of the present invention describes one possible implementation of properties attached to nodes of the main timing graph and TSGR.

Figure 9:
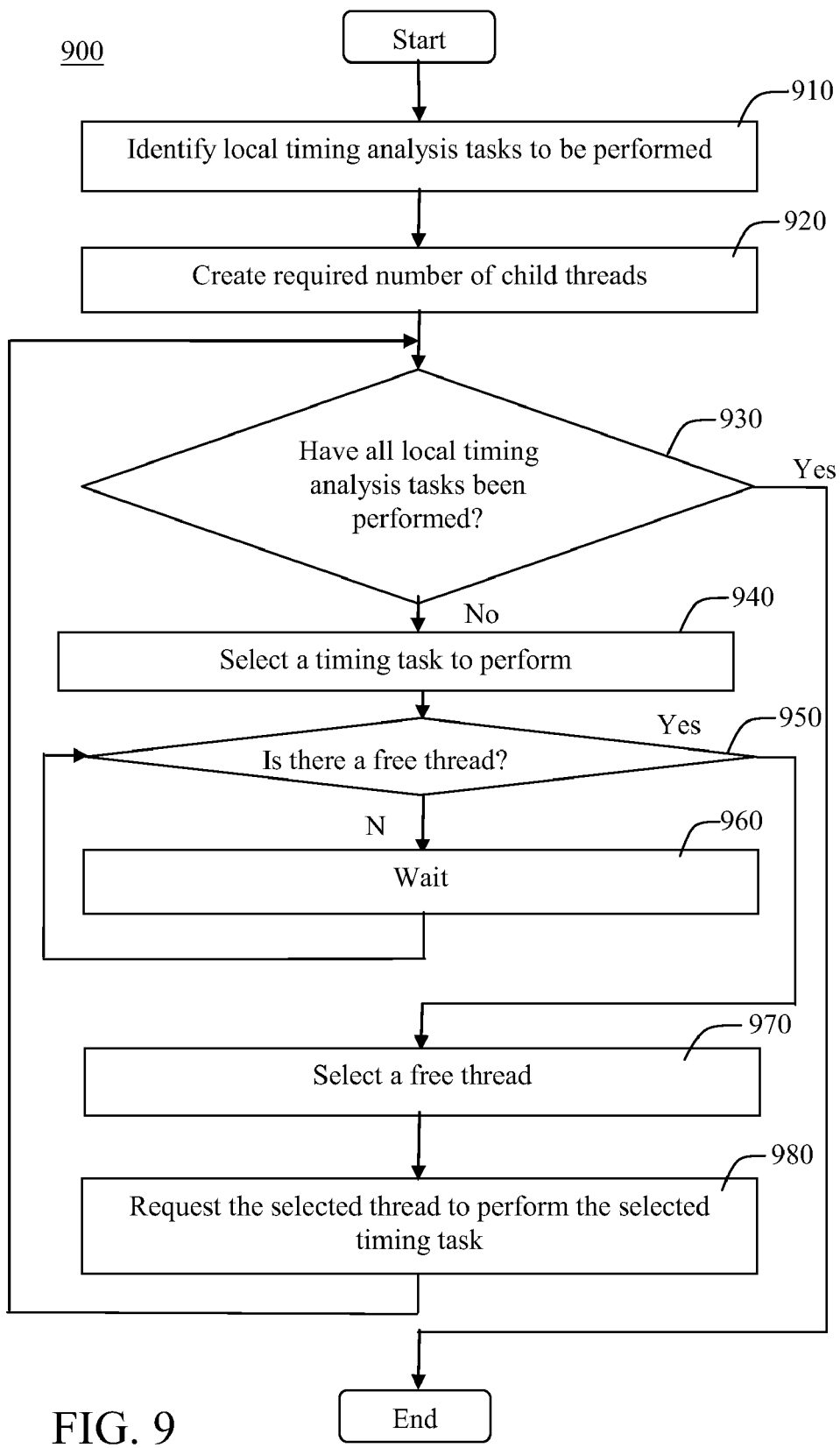
FIG. 9 is a flowchart showing method steps for a multi-threaded CPPR analysis, wherein local timing operations are performed using TSGR, according to one embodiment of the invention.

Referring to FIG. 9, there is shown a flow chart 900 illustrating one embodiment, wherein local timing operations are performed using TSGR. One such local timing operation consists of performing a CPPR analysis for a timing test. The flow shows how local timing analysis tasks are assigned to a child thread. The distribution of local timing analysis tasks is performed by the parent computational thread operating on the main timing graph.

In one embodiment, the local timing analysis task defines the job of performing CPPR on a particular timing test. It will be appreciated that numerous definitions of CPPR tasks can be formulated. By way of example, CPPR task can be defined with a memory element having several timing tests requiring CPPR analysis. In this case, the child thread performs CPPR for all timing tests of the memory element. A CPPR task can be also defined for a group of several memory elements. CPPR analysis tasks can also be defined to propagate consistent timing values forward from different clock divergence points.

It will be recognize that many other different local timing analysis tasks can be defined, including tracing a set of critical paths for timing report, and that use of a TSGR to perform any such local analysis tasks falls under the scope of the present invention.

The procedure starts at step 910, where the parent computation thread identifies the local timing analysis tasks to be performed. These identification is typically based on results of a previous global timing analysis performed on the main timing graph. By way of example, all the timing tests having a pre-CPPR analysis slack below a specified threshold can be identified as requiring CPPR analysis. From step 910 control branches to 920.

At 920, the parent computation thread creates a required number of child threads for performing local timing analysis tasks. The number of child threads created is advantageously determined according to the amount of the computational resources available and the number of timing tests to be processed. From step 920 control proceeds to 930.

At step 930, the parent computational thread checks whether all the local timing analysis tasks have already been performed. If all timing tests are processed, control comes to an end. Otherwise, control proceeds to step 940.

At 940, the parent computational thread selects the timing analysis task to be performed. The selection preferably uses several criteria to improve the workload balance and prioritize processing more critical timing analysis tasks, such as prioritizing CPPR analysis of timing tests with critical pre-CPPR timing slacks. From step 940 control proceeds to 950.

At 950, the parent computational thread determines whether there is any free child threads available. A child thread is considered free if it does not have any timing analysis task assigned thereto. If there is at least one free child thread control proceeds to 970. Otherwise, control proceeds to 960.

At 960, the parent computation thread waits either certain amount of time or until receiving a signal from child thread that completes the timing analysis task. The amount of waiting time is selected to optimize the overall performance of multithreaded computer system. From step 960, control proceeds to 970.

At 970, the parent computational thread selects a free child thread for assigning the selected timing test to process. The selection of a free child thread can use various criteria to improve the workload balance and optimize the performance of the multithreaded computer system. From step 970 control proceeds to 980.

At 980, the parent computational thread requests the selected child thread to perform the selected timing analysis task. After step 980, control proceeds to 930 to continue processing timing tests requiring CPPR analysis.

Although the present embodiment describes the use of "threads", the same method of achieving de-centralized dynamically scheduled parallel static timing can be implemented through the use of forked processes running on a multiprocessor system, multiple processes running across multiple machines, or any other combination thereof.

Generally, other methods of controlling the allocation of timing tasks to child processes are possible. For example, after identifying local timing analysis tasks to be performed, the main thread can place all of them in a locked work queue, and child threads can pull one or more timing tasks from the work queue when they are first activated. Every time they complete the work on all the timing analysis tasks, they are removed from the work queue. In such a flow, the main thread need not explicitly assign tasks to child threads. Child threads terminate when they find the work queue contains no more timing tasks to be performed.

Figure 10:
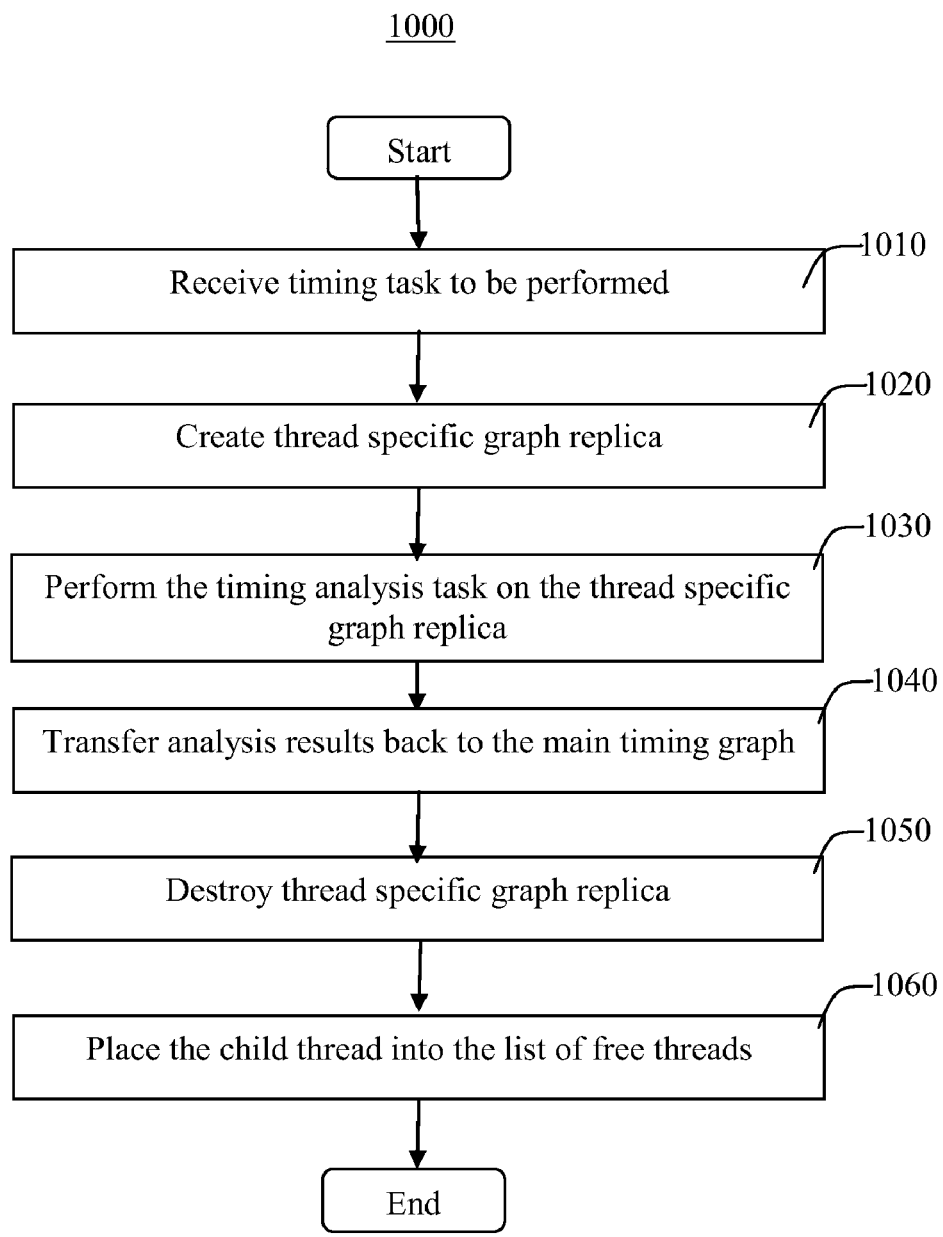
FIG. 10 is a flowchart showing method steps for performing CPPR analysis on thread specific graph replica with TSGR constructed by the child thread without setting any access locks, according to one embodiment of the invention.

FIG. 10 is a flowchart describing method (1000) for performing a timing analysis task in a child thread. The operation of the child thread is initiated by the parent computational thread at step 980 of flow chart 900, where the parent computational thread assigns a timing analysis task to the child thread. After that the child thread is activated from a wait state, it begins operation according to method 1000 at step 1010.

At 1010, a child thread receives the timing analysis task to be performed. This is best assigned by the parent computation thread as in step 980 of FIG. 9 or, if the timing task work queue is employed, by fetching a timing task from the work queue. From step 1010 control proceeds to 1020, at which point the child thread creates a thread specific graph replica (TSGR) of the sub-graph on which to perform the timing analysis task. According to one embodiment, the child thread creates TSGR without setting any access locks. Therefore, the construction of TSGR by child thread does not prevent other child threads or the parent computation thread from performing the operations. A detailed description of TSGR construction is given hereinafter.

In step 1030, the child thread performs the timing analysis task by on the constructed TSGR. The local analysis process is allowed to set any properties, timing values, flags, or attributes on the TSGR nodes and edges that are needed to complete the required task. Furthermore, the local analysis process is not allowed to access TSGR of the other child threads. As neither other child threads nor parent computation threads are accessed by TSGR, the local analysis can operate without setting access locks on the data structures describing TSGR. The local CPPR analysis can read data from the main timing graph that is not updated either by the parent computational thread or by other child threads. As such, it does not require access locks since the main graph data is guaranteed access to the read-only mode.

At step 1040, the child thread transfers the results of the local analysis back to the main timing graph. CPPR results are transferred back to the main timing graph where they are combined together by storing on each main graph timing node the worst slack computed for the node in any local CPPR analysis that produced results for the node. This can preferably be achieved by locking the publically updatable properties of the main graph node, reading the current value stored on the main graph node, determining the minimum of that value and the local TSGR value for the node, writing back the minimum result to the main graph node, and unlocking the publically updatable properties of the node.

In step 1050, upon completion of a given work unit, the child thread destroys its TSGR and frees the memory occupied with data structures. TSGR data preferably remains as a basis for incremental construction of additional data required for processing further timing tasks.

At 1060, the child thread places itself in the list of free child threads waiting for the next CPPR task to be allocated by the parent computational thread. Following step 1060, the procedure ends. Alternatively, if a timing task work queue is used the child thread can return to step 1010 to fetch another timing task from the work queue, terminating only when it finds the work queue to be empty.

Figure 11A:
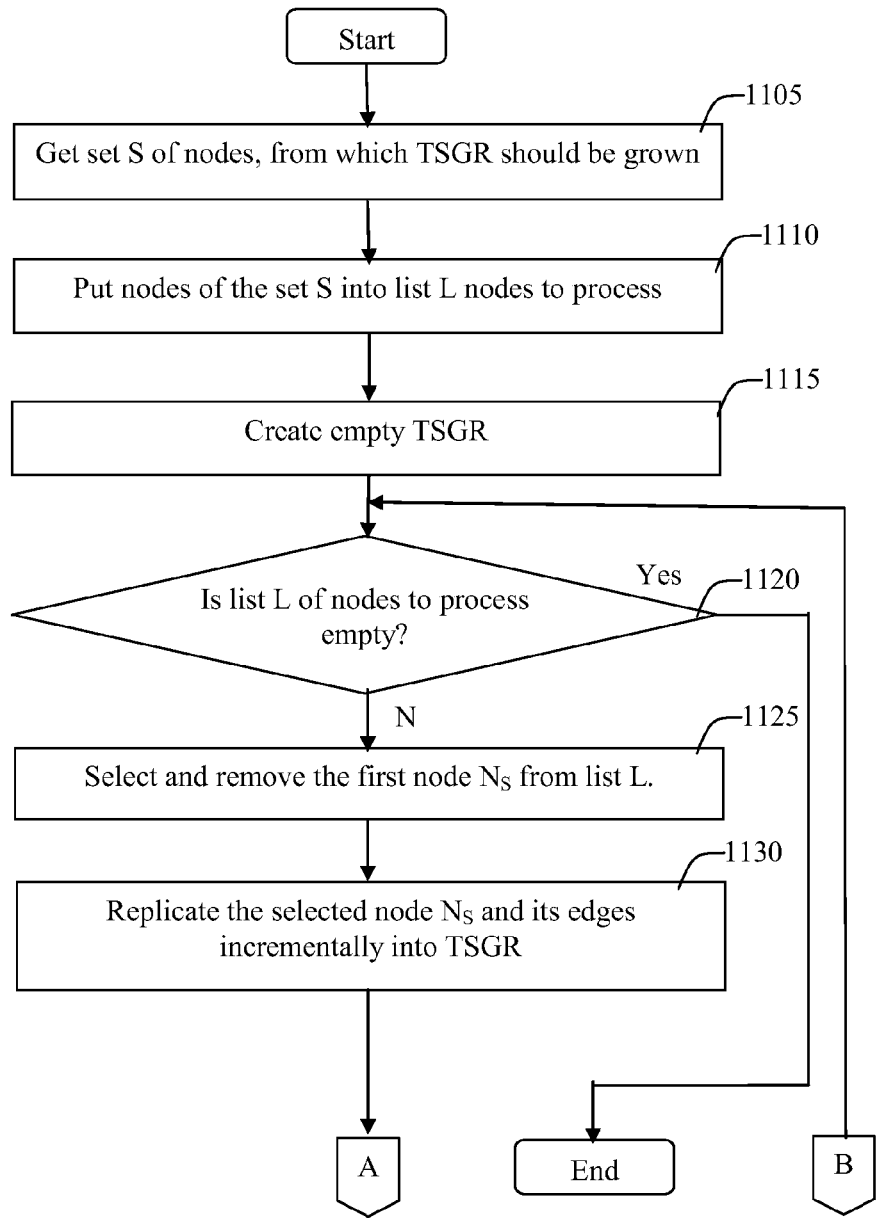
FIGS. 11a-11b show flowcharts for constructing thread specific graph replica according to one embodiment of the invention.
Figure 11B:
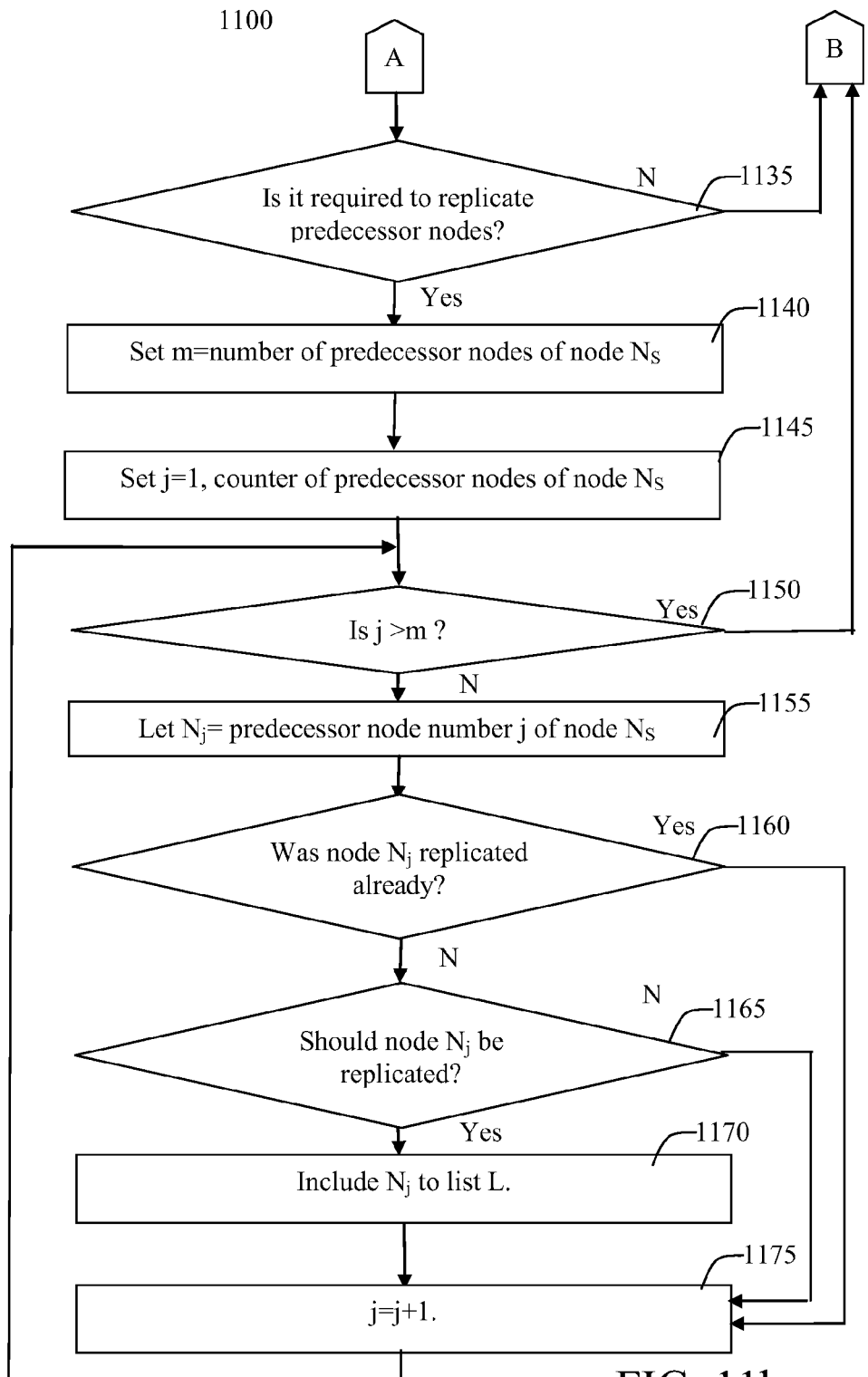

FIGS. 11a and 11b show a flow chart of the method 1100 for constructing thread specific graph replica (TSGR) by child thread. The process is executed in step 1020. TSGR is constructed by the child thread without setting any access locks. According to one embodiment, a child thread traverses the main timing graph backward starting from nodes of a timing test requiring CPPR analysis, path tracing, or other analyses. A corresponding TSGR is constructed incrementally by adding one TSGR node after another. Each node is added to TSGR together with the edges connecting the node added to the previously created TSGR nodes. TSGR nodes and edges are constructed and connected according to the connectivity of nodes and edges of the main timing graph. Concurrently with added nodes to TSGR, the method incrementally updates the mapping between TSGR nodes and the nodes of the main timing graph.

Method 1100 begins at step 1105 where it obtains set S of the nodes, from which TSGR is to be grown. According to embodiment of the invention which applies to the task of CPPR analysis, set S consists of two nodes of the timing test requiring CPPR analysis, path tracing, or other analyses. A timing test is provided to the child thread by the parent computational thread in step 980 of step 900 as an identifier for the CPPR analysis task to be performed. Other timing analysis tasks can start from different starting nodes and grow TSGR by adding particular fan-in or fan-out edges to TSGR.

In step 1110, the child thread put nodes of set S into list L of the nodes to process.

In step 1115, the child thread creates an empty TSGR, i.e. TSGR without nodes and edges. At this step, the child thread creates an empty map of nodes of the main timing graph to TSGR nodes.

In step 1120, the child thread determines whether list L of the nodes to process is empty. If the list L is empty, control ends the procedure of constructing TSGR. Otherwise, control proceeds to 1125.

In step 1125, the child thread selects the first node of list L. The method assigns name N to the selected node and removes it from list L.

In step 1130, the child thread replicates node N and its edges into TSGR. Replication is then performed by creating a replica of the node and adding it to TSGR. Additionally, the child thread creates edges connecting the replica node with other TSGR nodes, according to the connectivity of the nodes of the main timing graph. The replication procedure is described hereinafter in detail.

In step 1135, the child thread determines whether it is required to replicate the nodes that are immediate predecessor nodes to node N in the main timing graph. The decision is preferably made according to CPPR analysis algorithm having the criteria that decides which sub-graph of the main timing graph is to be processed by CPPR analysis in order to obtain correct results. Other timing analysis tasks can have different criteria for determining whether timing nodes adjacent (forward or backward) to just-replicated timing nodes are to be included in TSGR. If it is required to replicate the immediate predecessors of node $N_s$, control proceeds to step 1140. Otherwise, control proceeds to step 1120.

In step 1140, the child thread set variable m is equal to the number of the immediate predecessor nodes of node $N_s$.

In step 1145, the child thread initializes the counter j of the immediate processor nodes of node $N_s$, by setting j=1.

In step 1150, j is compared with m. If j>m, all the immediate predecessors of node $N_s$ are processed. Control then proceeds to step 1120. Otherwise, control proceeds to step 1155.

In step 1155, the $j^{th}$ predecessor of node $N_s$ is assigned name $N_j$.

In step 1160, the child thread determines whether node $N_j$ was already replicated. The check is made by determining if the map mapping nodes of the main timing graph to the corresponding replica nodes of TSGR has an entry for node $N_j$. If the entry for node $N_j$ exists, TSGR already has the replica of node $N_j$; and no additional replication is then required. In this case, control proceeds to step 1175. Else, control proceeds to 1165.

In step 1165, the child thread decides whether node $N_j$ should be replicated. In an embodiment, a decision is made according to the particular CPPR analysis algorithm or other timing analysis task being performed on TSGR. If node $N_j$ is to be replicated, control proceeds to step 1170. Otherwise, control passes to step 1175.

At step 1170, node $N_j$ is included in list L of nodes to be processed. Then control proceeds to step 1175.

At step 1175, counter j of the predecessor nodes of node $N_s$ is incremented by 1, and control proceeds to 1150.

It will be recognized that variations on method 1100 are possible. In one such variation, timing graphs edges (propagate and/or test segments) rather than timing points adjacent to just-added timing points are identified for addition to TSGR. In this case, addition of a timing graph edge necessarily requires addition of the opposite endpoint of the edge, if it is not already present in TSGR. In another variation a list of pending edges or nodes to add to TSGR is not used, instead a recursive procedure calls to immediately add any needed nodes or edges immediately after adding a previously added node to which they are adjacent.

In another variant, the execution of the timing task on TSGR is interleaved with the expansion of TSGR, and the decision whether or not to replicate a particular node or edge in TSGR is dependent at least in part on results already computed on the portion of TSGR created thus far.

In one embodiment, step 1100 traverses the main timing graph backward starting from the nodes of the timing test. In another embodiment, the TSGR construction can be preformed by forward traversing the main timing graph, even including both forward and backward traversal.

Figure 12A:
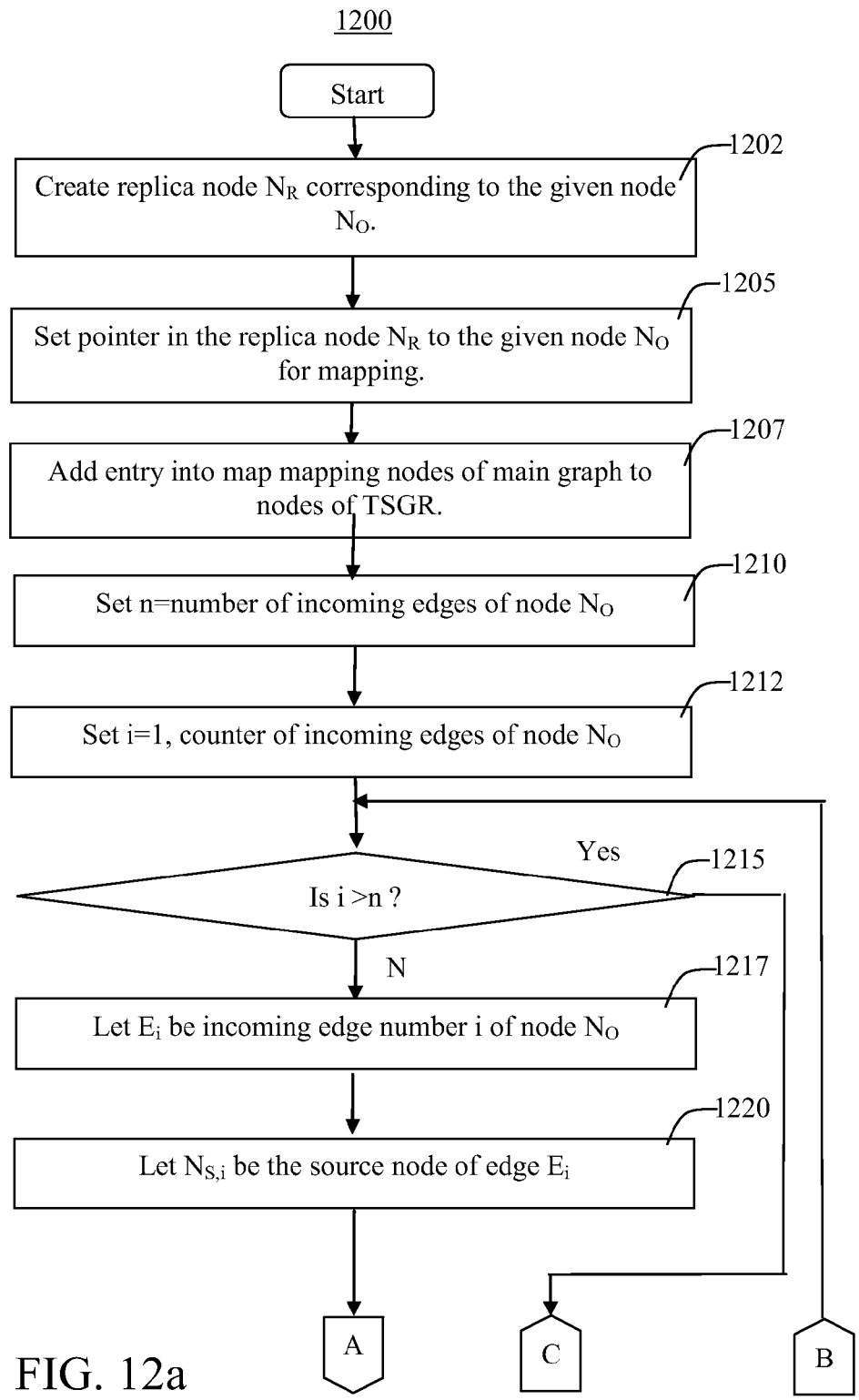
FIGS. 12a-12c show flowcharts for incrementally replicating a node of the main timing graph into thread specific graph replica, according to one embodiment of the invention.
Figure 12B:
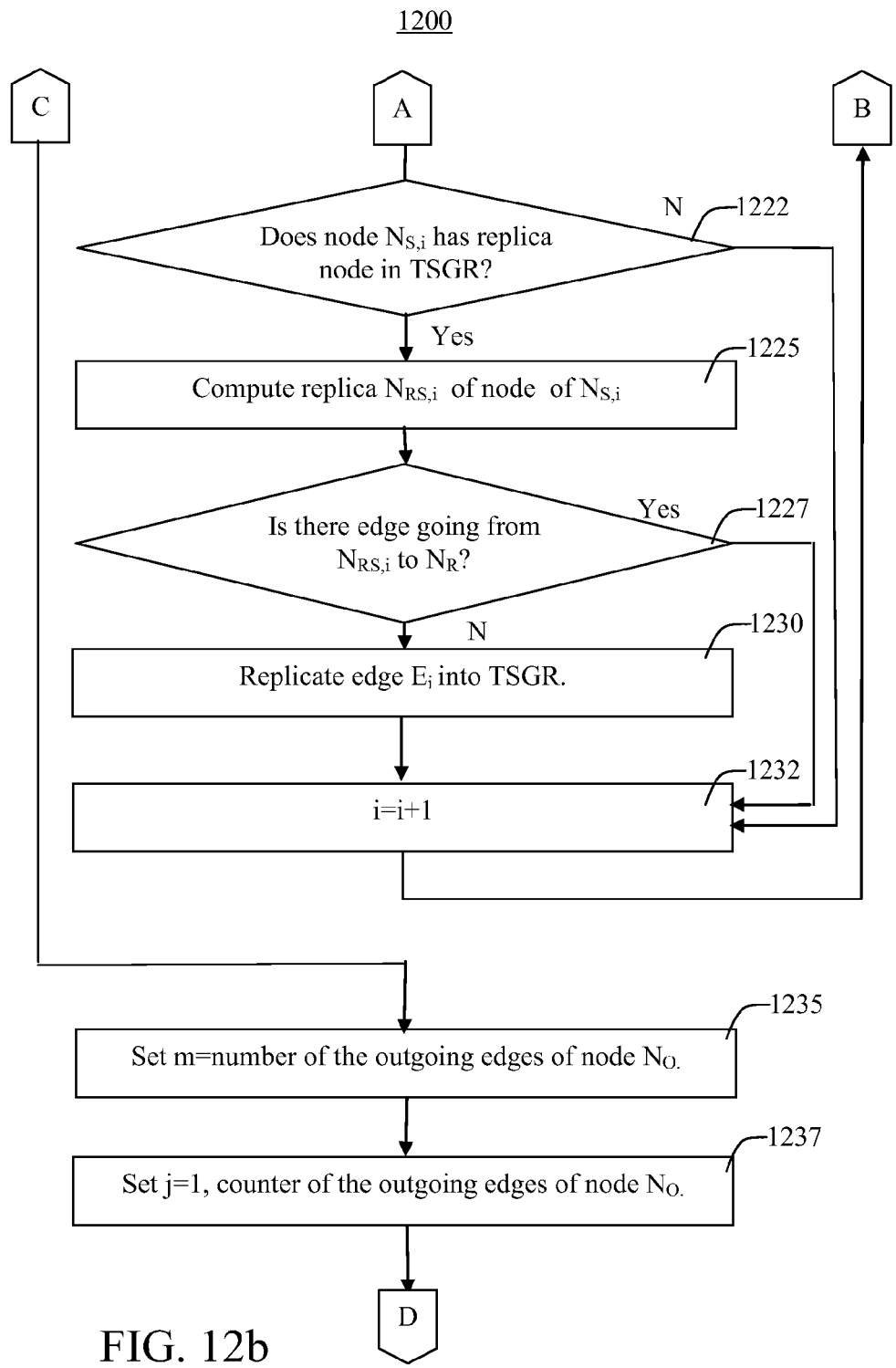
Figure 12C:
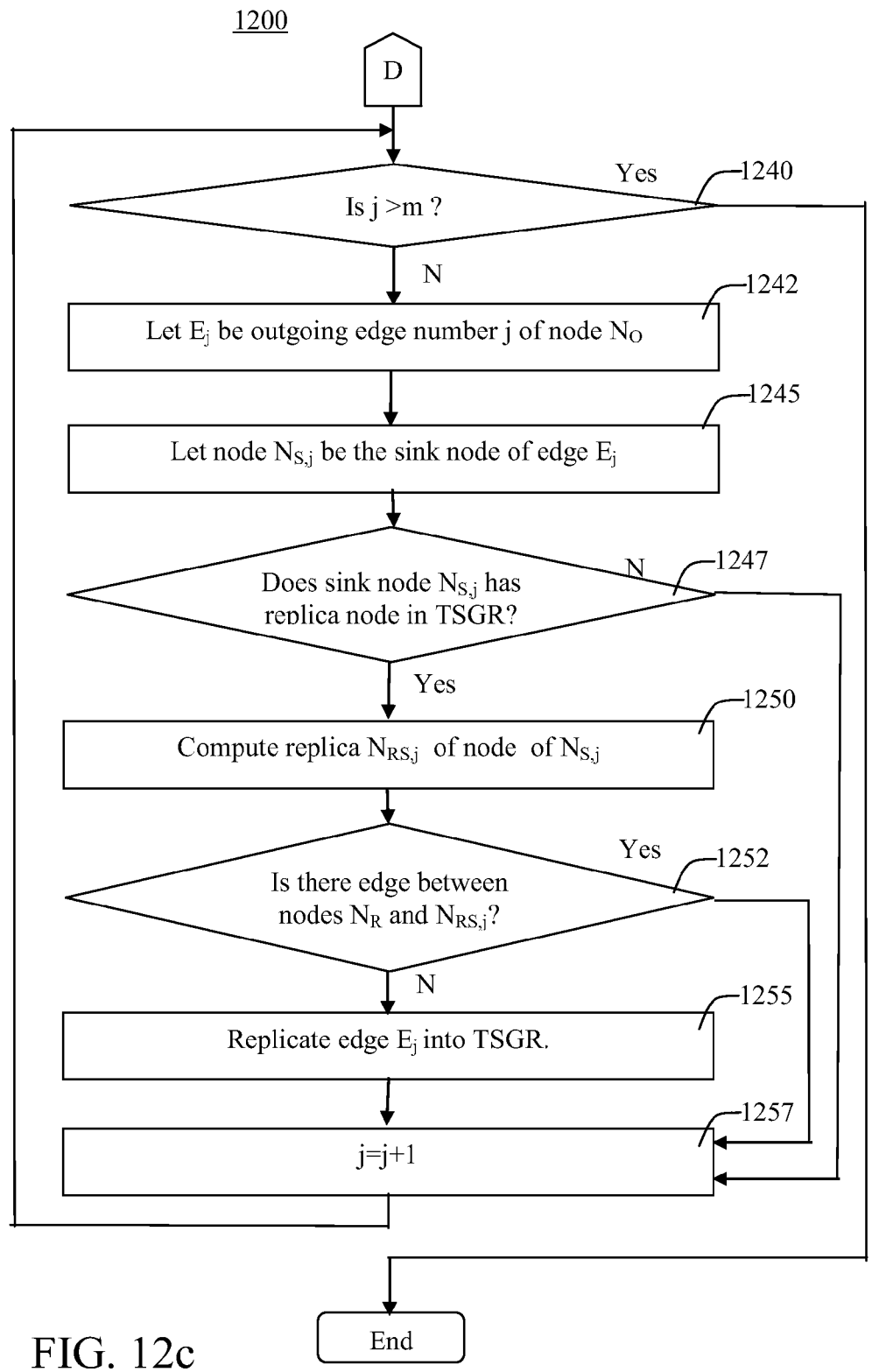

FIGS. 12*a-c* show a flow chart of method 1200 for replicating a given main timing graph node $N_O$ and its incident edges into a given TSGR. Execution starts at step 1130 by the child thread creating TSGR.

Method 1200 starts at step 1202, where a child thread creates an object describing a replica node $N_R$ corresponding to original node $N_O$.

In step 1205, the pointer defining mapping from TSGR node to the corresponding main timing graph node is set to point to node $N_O$. It sets mapping of node $N_R$ to node $N_O$.

In step 1207, the child thread adds a new entry to the map mapping main timing graph nodes into TSGR nodes. The map entry added defines mapping of node $N_O$ to node $N_R$.

In step 1210, variable n is set equal to the number of incoming edges of node $N_O$.

In step 1212, counter i of incoming edges of node $N_O$ is initialized at 1.

In step 1215, the counter variable i is compared to variable n. If i>n, all incoming edges of node $N_O$ have been processed, and control continues at step 1235. Otherwise, control proceeds to step 1217.

In step 1217, the $i^{th}$ incoming edge of node $N_O$ is selected and assigned to variable $E_i$.

In step 1220, the source node of edge $E_i$ is assigned to variable $N_{S,i}$.

In step 1222, the method checks whether node $N_{S,i}$, has the corresponding replica node in TSGR. The check is performed by determining whether the map of main timing graph nodes to the corresponding TSGR nodes has an entry for node $N_{S,i}$. If the answer is affirmative, TSGR takes the corresponding node $N_{S,i}$. In this case, control proceeds to step 1225. Otherwise control proceeds to step 1232. In this case, it is not necessary to create the replica of edge E at this time because either node $N_{S,i}$ will not be replicated in TSGR. Thus, the edge will never be created or the replica node $N_{RS}$, will be created for node $N_S$, later, at a time when the replica for edge E will be created.

In step 1225, replica node $N_{RS,i}$ of node $N_{S,i}$ is computed. The calculation is performed by looking up the map of main timing graph nodes to the corresponding TSGR nodes. Node $N_{S,i}$ is used as an entry to the map.

In step 1227, the method determines whether there is a TSGR edge spanning from node $N_{RS,i}$ to node $N_R$. If the edge exists, control proceeds to step 1232. Otherwise, control proceeds to step 1230.

In step 1230, edge $E_i$ of the main timing graph is replicated to TSGR. The replication is done by creating an edge in TSGR going from node $N_{RS,i}$ to node $N_R$.

In step 1232, counter variable i is incremented by 1.

In step, 1235 variable m is set equal to the number of outgoing edges of node $N_O$.

In step 1237, counter j of outgoing edges of node $N_O$ is initialized at 1.

In step 1240, counter variable j is compared with variable m. If j>m, all outgoing edges of node $N_O$ are processed; and the control comes to an end. Otherwise, control proceeds to step 1242.

In step 1242, the $i^{th}$ outgoing edge of node $N_O$ is selected and is assigned to variable $E_j$.

In step 1245, the sink node of edge $E_j$ is assigned to variable $N_{S,j}$.

In step 1247, the method checks whether node $N_{S,j}$ has a corresponding replica node in TSGR. A check is performed by determining if the map of main timing graph nodes to the corresponding TSGR nodes has an entry for node $N_{S,j}$. If the answer is affirmative, TSGR acquires the node corresponding to node $N_{S,j}$. Control proceeds to step 1250. Otherwise, it branches to step 1257.

In step 1250, replica node $N_{RS,j}$ of node $N_{S,j}$ is computed. The calculation is performed by looking up the map of main timing graph nodes to the corresponding TSGR nodes. Node $N_{S,j}$ is used as an entry to the map.

In step 1252, the method checks whether there is a TSGR edge going from node $N_R$ to node $N_{RS,j}$. If the edge exists control proceeds to step 1257. Otherwise, control proceeds to step 1255.

In step 1255, edge $E_j$ of the main timing graph is replicated to TSGR. The replication is done by creating an edge in TSGR going from node $N_R$ to node $N_{RS,j}$.

In step 1257, counter j is incremented by 1.

Method 1200 is advantageously used when TSGR is created by designating certain nodes to be included, and it is desired to create replicas in TSGR for all main graph edges for which both endpoints have replicas in TSGR. For certain timing tasks, they can be created by adding selected edges (and hence both endpoints of each edge) rather than nodes.

Figure 13:
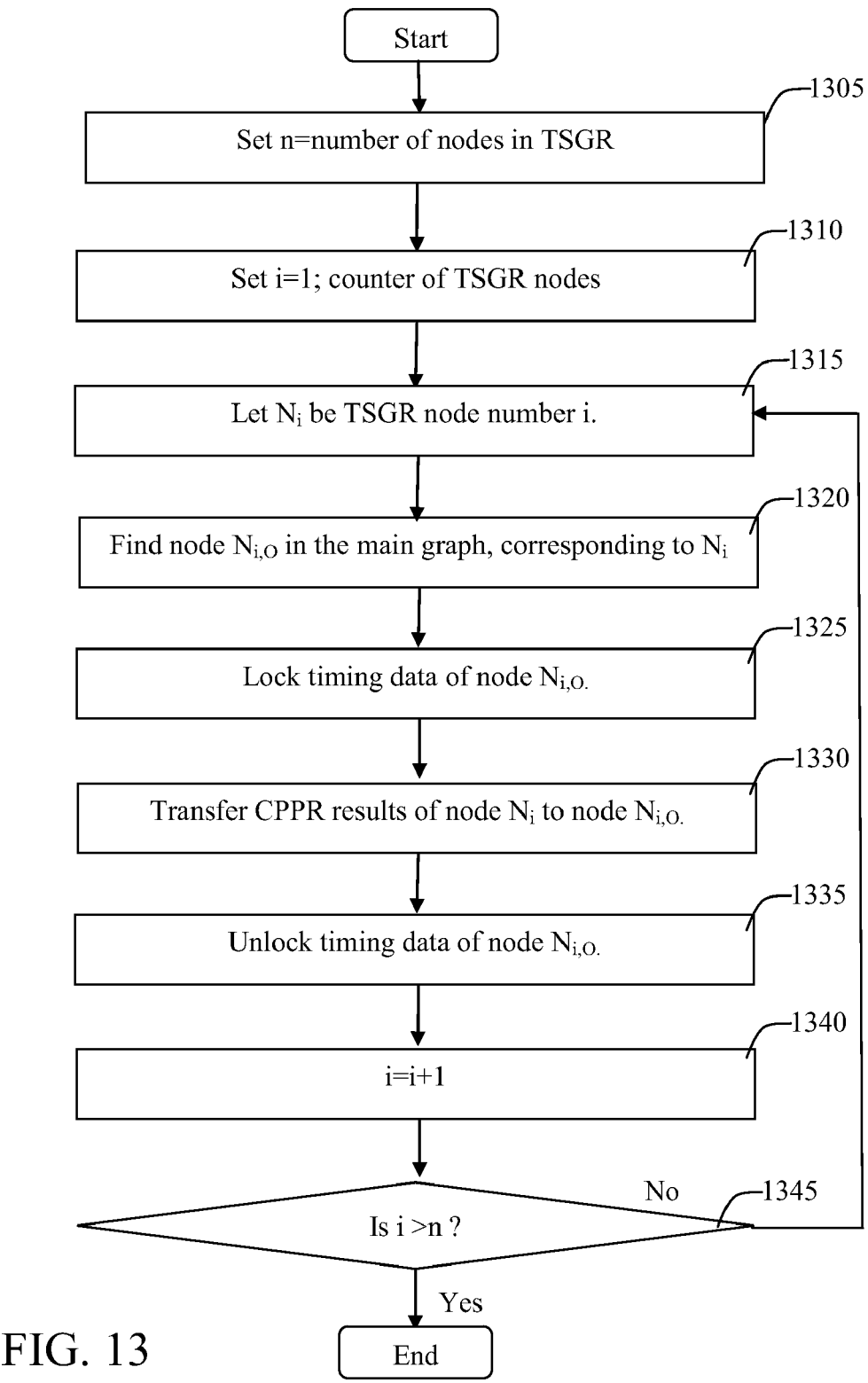
FIG. 13 is a flowchart of a method for transferring CPPR results from a thread specific graph replica to the main timing graph, according to one embodiment of the invention.

FIG. 13 shows a flow chart of method 1300 for transferring results of a timing analysis task performed on TSGR to the main timing graph. The process is executed by the child thread owing TSGR. In one embodiment, CPPR results that were computed by different child threads are merged at the nodes of the main timing graph.

The method 1300 starts execution at step 1040 of method 1000.

In step 1305, variable n is set equal to the number of TSGR nodes.

In step, 1310 counter variable i is initialized at 1.

In step 1315, the $i^{th}$ node of TSGR is assigned to variable $N_i$.

In step 1320, node $N_{i,O}$ of the main timing graph corresponding to TSGR node $N_i$ is found. Node $N_{i,O}$ is seen using a link in the object describing node $N_i$ pointing to the corresponding node of the main timing graph.

In step 1325, timing data describing aggregated results of the timing task in all child threads at node $N_{i,O}$ are locked. This is necessary because the same data can be accessed by several child threads simultaneously. It should be noted that the probability of simultaneously trying to update the timing results on the same node of the main timing graph by two or more timing threads is very low and, therefore, the access lock generally will not affect the overall performance and scalability of the multithreaded analysis. From step 1325 control proceeds to step 1330.

In step 1330, timing analysis results computed by the child thread are merged with the post-CPPR timing data accumulated at node $N_{i,O}$ and written back to node $N_{i,O}$. One such merging operation preferably includes reading the value $V_{i,O}$ from node $N_{i,O}$, computing the minimum of $V_{i,O}$ and the locally computed result $V_{i,R}$, and replacing value $V_{i,O}$ with the computed minimum value.

In step 1335, the timing data describing the combined results of CPPR analysis at node $N_{i,O}$ are unlocked. From 1335 control proceeds to step 1340.

In step 1340, counter variable i is incremented by 1. Control proceeds then to step 1345.

In step 1345, counter variable i is compared with variable n. If i>n, all TSGR nodes are processed. Thus, control ends method 1300. Otherwise, control proceeds to step 1315.

The present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is to be understood that one of ordinary skill in the art can extend and apply the present invention in many obvious ways. It is to be understood that while the illustrative example showed a small circuit and a small timing graph, the invention applies to circuits and graphs of any size. In the illustrative example, for purposes of clarity, rising and falling timing quantities were not differentiated, but one of ordinary skill in the art could apply the present invention to a situation with different rising and falling delays, slews, ATs and RATs. Otherwise, it could also apply the invention to any type of static timing, including, but not limited to, static timing of gate-level circuits, transistor-level circuits, hierarchical circuits, circuits with combinational logic, circuits with sequential logic, timing in the presence of coupling noise, timing in the presence of multiple-input switching, timing in the presence of arbitrary timing tests such as setup, hold, end-of-cycle, pulse width, clock gating and loop-cut tests, and timing in the presence of multiple clock domains.

While the present invention has been particularly described in conjunction with exemplary embodiments, it is evident that many alternatives, modifications and variations will be apparent to those skilled in the art in light of the present description. It is therefore contemplated that the appended claims will embrace any such alternatives, modifications and variations as falling within the true scope and spirit of the present invention. It should be understood that the description, while indicating preferred embodiments of the present invention and numerous specific details thereof, is given by way of illustration and not of limitation. Many changes and modifications can be made within the scope of the present invention without departing from the spirit thereof, and the invention includes all such modifications.

The invention claimed is:

1. A method for efficiently performing a multithreaded analysis of a timing graph of a circuit comprising:
    a. using a computer, identifying a plurality of timing analysis tasks comprising performing a common path pessimism removal and computer critical paths for timing reports and identifying associated sub-graphs of said timing graph of said circuit upon which each timing analysis task is to be performed;
    b. creating a plurality of child computational threads and assigning thereto at least one of said identified timing analysis tasks;
    c. creating in each of said plurality of child threads a thread-specific graph replica (TSGR) of said associated sub-graph of said timing graph of said circuit on which said at least one timing analysis task assigned thereto is to be performed;
    d. performing in each child thread said at least one timing analysis task assigned thereto, wherein all timing data generated and stored in said performance is stored in said TSGR of said associated sub-graph of said timing graph; and
    e. transferring results from each of said timing analysis task performances in said child threads back onto said timing graph.

2. The method as recited in claim 1, wherein said TSGR further comprising a plurality of replica elements with a correspondence to elements of said sub-graph of said timing graph, said elements comprising nodes and edges.

3. The method as recited in claim 2, wherein said correspondence is represented by a pointer to an element of said timing graph stored with each of said plurality of replica elements and a map for said TSGR for finding a one of said plurality of replica elements corresponding to a given one of said elements of said sub-graph of said timing graph.

4. The method as recited in claim 3, wherein said identifying a sub-graph on which a timing analysis task is to be performed comprises identifying at least one element of said timing graph for which a replica element in said TSGR is created, and at least one selection criterion for determining other elements of said timing graph for creating said replica elements.

5. The method as recited in claim 4, wherein said at least one element is a timing test segment.

6. The method as recited in claim 4, wherein said at least one selection criterion is applied to edges.

7. The method as recited in claim 4, wherein said at least one selection criterion is applied to nodes adjacent to nodes already selected for inclusion in said sub-graph.

8. The method as recited in claim 4, wherein said at least one selection criterion is applied to nodes adjacent to nodes already selected for inclusion in said sub-graph.

9. The method as recited in claim 4, wherein said creating said TSGR further comprises applying said selection criterion to one or more incoming and outgoing edges of each replica node added to said TSGR.

10. The method as recited in claim 4, wherein said TSGR and said timing graph are implemented with same data structures.

11. The method as recited in claim 4, wherein said at least one property associated with at least one set of elements of said timing graph and all said elements of said TSGRs associated thereto, each of said at least one properties consisting of:
    i. private TSGR properties that are accessed without locking only from elements of one of said TSGRs;
    ii. public read-only properties accessible without locking, for reading only, from said timing graph or any of said TSGRs; and
    iii. public updatable properties that are accessible with locking, for reading or writing, from said timing graph or anyone of said TSGRs.

12. The method as recited in claim 1, wherein said assignment of said timing tasks to said child threads is performed by said parent computation thread.

13. The method as recited in claim 1, wherein said assignment of said timing tasks to said child threads comprises:
   i. placing said timing tasks in a work queue by said parent computation thread, and
   ii. receiving said timing tasks from said work queue by said child threads.

14. The method as recited in claim 1, wherein said creating said TSGR is performed without locking.

15. The method as recited in claim 1, wherein each of said TSGRs is only accessed by one of said created child threads.

16. The method as recited in claim 1, wherein said timing analysis tasks perform a common path pessimism removal (CPPR).

17. The method as recited in claim 1, wherein said timing analysis tasks comprise critical path reporting.

18. The method as recited in claim 1, wherein said timing analysis tasks are performed using statistical timing quantities.

19. The method as recited in claim 1, wherein access locks transfer results back onto said timing graph, in combination with results of said timing analysis task performances in said child threads.

20. A program storage device readable by a machine, tangibly embodying a program of instructions executable by the machine for efficiently performing a multithreaded analysis of a timing graph of a circuit, said method steps comprising:
   a. using a computer, identifying a plurality of timing analysis tasks comprising performing a common path pessimism removal and computing critical paths for timing reports and identifying associated sub-graphs of said timing graph of said circuit upon which each timing analysis task is to be performed;
   b. creating a plurality of child computational threads and assigning thereto at least one of said identified timing analysis tasks;
   c. creating in each of said plurality of child threads a thread-specific graph replica (TSGR) of said associated sub-graph of said timing graph of said circuit on which said at least one timing analysis task assigned thereto is to be performed;
   d. performing in each child thread said at least one timing analysis task assigned thereto, wherein all timing data generated and stored in said performance is stored in said TSGR of said associated sub-graph of said timing graph; and
   e. transferring results from each of said timing analysis task performances in said child threads back onto said timing graph.

\* \* \* \* \*